(12) United States Patent
Ur (10) Patent No.: US 11,334,649 B2
(45) Date of Patent: *May 17, 2022

(54) METHOD, SYSTEM AND PRODUCT FOR VERIFYING DIGITAL MEDIA

(71) Applicant: Shmuel Ur Innovation LTD., Shorashim (IL)

(72) Inventor: Shmuel Ur, Shorashim (IL)

(73) Assignee: Shmuel Ur Innovation LTD., Shorashim (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/079,475

(22) Filed: Oct. 25, 2020

(65) Prior Publication Data

US 2021/0042397 A1 Feb. 11, 2021

Related U.S. Application Data

(63) Continuation of application No. 16/902,287, filed on Jun. 16, 2020, now Pat. No. 10,860,692.

(60) Provisional application No. 62/862,071, filed on Jun. 16, 2019.

(51) Int. Cl.
| | |
|---|---|
| *H04N 7/15* | (2006.01) |
| *G06F 21/10* | (2013.01) |
| *G06F 16/435* | (2019.01) |
| *H04L 65/60* | (2022.01) |

(52) U.S. Cl.
CPC .......... *G06F 21/10* (2013.01); *G06F 16/435* (2019.01); *H04L 65/605* (2013.01); *H04N 7/15* (2013.01); *G06F 2221/0724* (2013.01)

(58) Field of Classification Search
CPC ......... G06F 21/10; G06F 16/435; H04N 7/15; H04L 65/602; H04L 65/605; H04L 65/403; H04L 63/123; H04L 65/60; H04L 63/08
USPC ........................................... 348/14.01–14.16
See application file for complete search history.

(56) References Cited

U.S. PATENT DOCUMENTS

| | | | | |
|---|---|---|---|---|
| 9,852,612 | B2* | 12/2017 | Hildmann | G08B 13/19695 |
| 10,810,725 | B1* | 10/2020 | Dolhansky | G06N 3/00 |
| 2004/0044670 | A1* | 3/2004 | Cazier | H04N 1/32144 |
| 2010/0180009 | A1* | 7/2010 | Callahan | G06Q 30/0261 |
| | | | | 709/217 |
| 2012/0191970 | A1* | 7/2012 | Blom | H04L 63/0823 |
| | | | | 713/153 |
| 2012/0262575 | A1* | 10/2012 | Champagne | G08B 13/19613 |
| | | | | 348/143 |
| 2014/0078241 | A1* | 3/2014 | Vaisburd | H04N 7/15 |
| | | | | 348/14.08 |
| 2016/0373910 | A1* | 12/2016 | Moss | H04M 3/5116 |
| 2017/0180138 | A1* | 6/2017 | Giladi | H04L 65/60 |

(Continued)

*Primary Examiner* — Melur Ramakrishnaiah
(74) *Attorney, Agent, or Firm* — The Law Office of Joseph L. Felber (57) ABSTRACT

Method, system and computer program product, the method comprising: during a streaming session of a media by a capturing device to the processing platform, transmitting to the capturing device an instruction to implement an operation mode when capturing a second portion of the media; receiving from the capturing device the media, wherein the media comprises at least a first portion and the second portion; and verifying authenticity of the media, wherein said verifying is based on a determination that the second portion of the media complies with the operation mode.

22 Claims, 4 Drawing Sheets

(56) References Cited

U.S. PATENT DOCUMENTS

2017/0195721 A1* 7/2017 Grant ...................... G06F 16/40
2019/0019278 A1* 1/2019 Gibbon .............. G06K 9/00288

* cited by examiner

METHOD, SYSTEM AND PRODUCT FOR VERIFYING DIGITAL MEDIA

CROSS-REFERENCE TO RELATED APPLICATION

This application is a continuation of and claims the benefit of U.S. patent application Ser. No. 16/902,287, entitled "DIGITAL MEDIA VERIFICATION" which is a non-provisional of Provisional Patent Application No. 62/862,071, filed Jun. 16, 2019, all of which are hereby incorporated by reference in their entirety without giving rise to disavowment.

TECHNICAL FIELD

The present disclosure relates to media verification in general, and to a method and apparatus for verification of streamed media, in particular.

BACKGROUND

Media capturing and sharing is becoming more and more common, as the required equipment is widely available, and even users with little expertise are able to create and share media. A simple smartphone operated by a non-expert user is sufficient for capturing and sharing images, audio segments or video segments. More sophisticated users may create advanced media, such as edited images, collages, audio clips or video clips. In addition, many media pieces are created by collaborative work, such as conference audio calls, meetings held over a network using platforms such as Zoom®, Teamviewer®, or the like.

The created media can then be shared by and between its creators, as well as with other people, and can be easily further spread to other people or organizations, such that the creator(s) cannot control the media anymore.

While such technologies can and are used for many positive purposes, such as research and development, business, education, or socializing, the media is highly vulnerable to misuse. Such misuses may include creating fake news, malicious hoaxes, shaming individuals, fake celebrity videos, revenges, or the like.

The media may be manipulated using simple means available even to non-experts, such as but not limited to any one or more of the following: using accessible photo or video editing applications to add, remove, or modify objects in an image; taking a picture of an existing picture (which in itself may be manipulated) with the intention of passing it off as an original picture; changing location, time, date, or other information typically embedded within a photo or video by the capture device to make it appear as if it were captured somewhere else, at another time or with a different parameter; re-sharing a photo or video found on the internet as if it were an original, with or without additional modification, or the like.

Additionally, or alternatively, more advanced techniques may be used for manipulating or tampering with media.

One such technique is termed Deepfake, being a portmanteau of "deep learning" and "fake", which exercises human image synthesis based on artificial intelligence. Deepfake is used to combine and superimpose existing images and videos onto source images or videos using machine learning techniques such as a Generative Adversarial Network (GAN). The combination of the existing and source videos results in a video that can depict a person or persons saying things or performing gestures or actions that never occurred in reality. Deepfakes are often used to create fake news and malicious hoaxes related to politicians, celebrities, or the like.

Another technique used for malicious purposes may use Augmented Reality (AR) skins for modifying images in real time, for example switching people to something else, changing faces, changing animals to other animals, or the like.

Yet another technique used for malicious purposes is phone sensor emulation. This technique can be used for positive purposes such as testing sensors of a phone, but also enables the creation of fake news. For example, it may create a video of someone shaking while in reality they are not, an image or video with twisted colors or voice, or the like.

These techniques and others raise a significant doubt of the authenticity of media, such that any media clip may be suspected and cannot serve as evidence to the occurrence of the depicted events.

BRIEF SUMMARY

One exemplary embodiment of the disclosed subject matter is a computer-implemented method comprising: during a streaming session of a media by a capturing device to the processing platform, transmitting to the capturing device an instruction to implement an operation mode when capturing a second portion of the media; receiving from the capturing device the media, wherein the media comprises at least a first portion and the second portion; and verifying authenticity of the media, wherein said verifying is based on a determination that the second portion of the media complies with the operation mode. Within the method, said verifying optionally comprises verifying that the second portion of the media is streamed to the processing platform within a time threshold from a time in which the instruction is transmitted to the capturing device. Within the method, the media is optionally selected from at least one of: a video data and an audio data. Within the method, the operation mode optionally comprises a capturing parameter of the capturing device, wherein the capturing parameter affects a manner in which the capturing device captures the media. Within the method, the capturing parameter is optionally at least one of: a resolution level, a frame rate, a light sensitivity, and a microphone capturing parameter. Within the method, the operation mode optionally comprises an indication of operating an actuator to cause an effect that is capturable by the capturing device. Within the method, the actuator is optionally operatively coupled to the capturing device. Within the method, the instruction is at least one of: an instruction to activate a flashlight; an instruction to cause emission of directional light; an instruction to cause emission of light in a predetermined light spectrum; an instruction to generate an audio signal via a speaker; and an instruction to activate a vibration motor. Within the method, implementing the instruction is optionally unnoticeable by a human. Within the method, the audio signal optionally comprises frequencies undetectable by a human ear. The method can further comprise, in response to said verifying, providing to a third-party that is receiving the media during the streaming session, an indication of authenticity of the media. The method can further comprise: obtaining a first media fingerprint that is computed based on the media; in response to said verifying, storing the first media fingerprint of the media in a verified media database; and verifying authenticity of a second media that is characterized by a second media fingerprint, wherein said verifying is performed based on a determination that the second media fingerprint is included in the verified media database. The method can further comprise, the processing platform computing the second media fingerprint based on the second media. The method can further comprise the processing platform receiving the second media fingerprint from a querying device. Within the method, the media optionally comprises a plurality of portions, each of which corresponds to an operation mode consistent with a different instruction, wherein the plurality of portions comprises the second portion. Within the method, the authenticity of the media is optionally verified subject to at most a predetermined number of frames or samples of the second portion being missing or incompliant with the operation mode. Within the method, the authenticity of the media is optionally verified subject to frames of the second portion which are incompliant with the operation mode, being captured at the latest at a predetermined period after a time in which the instruction is transmitted to the capturing device. Within the method, the processing platform is optionally a server. Within the method, the processing platform is optionally implemented on a second capture device, wherein the capture device and the second capture device are used in a peer-to-peer video conference.

Another exemplary embodiment of the disclosed subject matter is a computer-implemented method comprising: capturing a first portion of the media by the capture device operating at a first operation mode; receiving from the processing platform an instruction to set a second operation mode; and capturing a second portion of the media by the capture device while operating at the second operation mode.

Yet another exemplary embodiment of the disclosed subject matter is a system having a processor and a memory, the processor being adapted to perform the steps of: during a streaming session of a media by a capturing device to the processing platform, transmitting to the capturing device an instruction to implement an operation mode when capturing a second portion of the media; receiving from the capturing device the media, wherein the media comprises at least a first portion and the second portion; and verifying authenticity of the media, wherein said verifying is based on a determination that the second portion of the media complies with the operation mode.

Yet another exemplary embodiment of the disclosed subject matter is a non-transitory computer readable medium retaining program instructions, which instructions when read by a processor, cause the processor to perform: during a streaming session of a media by a capturing device to the processing platform, transmitting to the capturing device an instruction to implement an operation mode when capturing a second portion of the media; receiving from the capturing device the media, wherein the media comprises at least a first portion and the second portion; and verifying authenticity of the media, wherein said verifying is based on a determination that the second portion of the media complies with the operation mode.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is the need to verify whether digital media, e.g., digital photos, audio, and/or videos, is authentic or has been manipulated or tampered with. It may be desired to verify that the digital media originated from the alleged person and/or location, and/or that the digital media was captured at the alleged time and date.

In the description below, unless specifically noted otherwise, the terms "authentication", "verification", "verifying authentication" and similar variations are used interchangeably.

Any of the techniques described above can be used to manipulate or tamper with media, such that a layperson or even a professional listener or viewer may not notice the manipulation, which makes it hard to trust any such media, and certainly to use it as evidence to the occurrence of the depicted events. A number of naïve approaches exist for fighting these techniques, but none of them can provide satisfactory assurance to the authenticity of media.

One such naïve approach to ensuring the authenticity of media includes generating a private and public key pair as an identity proof. According to this approach, captured media may be signed with the private key in real time, and a snapshot of sensor data may be captured and signed with the private key as well, e.g., to gather a correlating proof. The public key may then be communicated to a third party to enable the third party to verify the captured media.

However, this approach is based on the assumptions that a user of a device acts in an honest manner and has no malicious intentions, and that the private key is actually private and thus unreachable by others. These two assumptions are not always correct and cannot be relied on. In one example, a private key of a first device may be copied to a second device and used to generate a video on the second device. There may be no way to determine whether the video was signed by the first or by the second device. In another example, a user of a device may generate an additional private key, generate a video and sign the video with the additional private key. In yet another example, a video generated and signed by a first device may be transmitted to a second device with a corresponding private key. Any changes created by the second device will be untraceable, since the person making the alteration is also the signing person, and if the person cannot be trusted, signing will not make a difference.

Obtaining a private key of a device is not a difficult task. In particular, when a user has access to the device, the user may easily obtain the private key generated by the device.

In some exemplary embodiments, a possible remedy and/or correction to the deficiency of this approach may include a hardware mechanism for generating a private key, which may be more difficult to manipulate. However, this correction is expensive and may still not be effective against attacks such as deepfake attacks.

Another naïve approach to the problem may include uploading in real time a stream of sensor data, e.g., a video or multiple hash values of the video, to a secure server. The secure server may insert a time stamp to the stream, such that no later modifications to the video are allowed. When the video is utilized by the user, e.g., published on a social media site, the secure server may provide a certification indicating that the video is identical to the stream of sensor data or consistent with the hash values received by the server in real time.

However, this approach may not be sufficient since attacks such as deepfake videos may still be possible, even if more difficult to implement.

Yet another naïve1 approach to the problem may include utilizing metadata of the media and ensuring its consistency with the media itself. Location data, such as GPS location, nearby cell towers or Wi-Fi networks, may be examined for discrepancies. In some cases, discrepancies between the metadata and the media may be identified, such as accelerometer readings that are inconsistent with the movement of the phone as depicted by the video. Additionally, the video may be analyzed to determine whether the sensors of the capturing device are consistent with each other and/or with external information. For example, the secure server may compare Global Positioning System (GPS) sensor information received from the media capturing device to known parameters related to the GPS information. In one case, based on a timestamp and GPS information, it may be determined that the media capturing device is located in Spain and that the local time in Spain should be 2 AM. This may contradict the video content, which may include a full daylight background. As another example, the video may exhibit a different angle of the sun than expected at the identified location at the identified time. However, this approach may also be insufficient, since attacks such as deepfake videos may still be possible, e.g., even if more difficult to implement. In particular, metadata that would be viewed as consistent may be generated together with the media, for example by using a GAN. Additionally, this approach may not be efficient in many situations, such as small but significant time or location differences, indoor capturing, or the like.

One technical solution provided by the disclosed subject matter, and which overcomes the deficiencies of the approaches described above, comprises a client-server system for verifying the authenticity of captured media. The client may be a capture device, such that the output of the capture device needs to be verified for authenticity. The server may be any computing platform, which may be in operative wired or wireless communication with the capturing device, for example over the Internet, over a local area network, or the like. Thus, the server may be collocated, remote, cloud-based, on the same network as the capture device, or the like. In some embodiments, one or more clients may also serve as a server. In some embodiments, the server may be a secure and/or trusted server. For clarity purposes, the disclosure focuses on the example of video capturing. However, the disclosed subject matter is not limited to such a media, and may be utilized with respect to any form of media.

In some exemplary embodiments, the media capturing device, e.g., mobile phone, camera, augmented reality (AR) glasses, or the like, may include one or more sensors, e.g., a plurality of sensors such as a camera, a microphone, an accelerometer, a temperature sensor, a color sensor, a humidity sensor, a proximity sensor, a touch sensor, a gyroscope sensor, a magnetometer sensor, or the like. In some exemplary embodiments, a media capturing device may include one or more actuators, or can control one or more actuators, such as but not limited to a flashlight or another light source, speakers, a vibrator, or the like, which may be activated in one or more operation modes. In some exemplary embodiments, a media capturing device may include any other sensors or actuators, and/or exclude any of the sensors. The sensors and actuators may be configured to function according to one or more operation modes, for example, a camera sensor may operate at a certain resolution level, frame rate, light sensitivity, or other frame related parameters.

Once the capturing device has begun capturing, or at a later time when capturing is still in process, the capturing device may otherwise indicate to the server that streaming has begun. In a specific case where it is required to authenticate an image rather than a video, a video may be captured in addition to the image, wherein the video may be of lower quality than the image. The image may then be compared to images of the video in a manner that will detect authenticity despite the quality and slight time differences. Additionally or alternatively, the capturing device may start streaming the captured media to the server. The server may then send to the capturing device an instruction, or an indication to an instruction, to implement an operation mode. The operation mode may relate to a capturing parameter of one or more sensors of the capture device, such as a frame rate, a resolution level, light sensitivity, voice sensitivity, or the like. Additionally or alternatively, the operation mode may relate to operating one or more of the actuators to cause an effect that can be captured by the capturing device, for example emit a certain light that may be captured in images, activate a speaker to play a sound that may be captured by a microphone, activate vibrations that alter the video, or the like.

The instruction may be such that its implementation is straight forward. However, the instruction may be such that faking the effect of the instruction on an existing media is complex and cannot be easily done in real time. In other words, manipulating media that has been captured without implementation of the instruction so that the media seems like the instruction has been implemented, is hard to achieve, particularly in real time. For example, changing the frame rate to a value such as 57, 38 or even a non-integer number such as 58.64 frames per second, or the like, will make it hard to compute corresponding images from a stream captured at another, possibly standard frame rate, such as 25 frames per second. Using the same video with altered time stamps will cause the video to appear slower or faster and incorrect.

In another example, imitating the effect of directional light shed on the captured may be extremely hard to perform in real-time.

In yet another example, increasing the capturing resolution without the additional information enabled when resolution is actually increased during capturing, is computationally heavy, and can be easily detected, for example by determining the mathematic operation used for computing the values of the added pixels.

In a further example, an audio signal is hard to add to an existing audio or video, for example due the echoes created by objects in the scene due to the added signal, while requiring no additional effort during capturing, and also easy to detect in the resulting signal.

As yet another example, the instruction may be to cause the media capturing device to vibrate. The vibrations may be visible in the video itself, although they may be made small enough such as not to disturb a human viewer. However, computing the effects of vibrations in a fake video may be hard to perform in real time. In some exemplary embodiments, the device may have motion stabilization, implemented in hardware, software, combination thereof, or the like. As a result, the effects of the vibrations may be reduced by the motion stabilization. As the motion stabilization used may be known to the authentication server, such as due to the device being used to record the media being known, forensic analysis may be performed to verify whether the vibrations were indeed implemented or faked over an existing video. The verification may require significantly less computational resources than forging such effect, therefore it may be hard or even impossible to fake it in real time. However, even if verification takes the same or even longer time then forging, this is not a problem, since verification does not have to be done in real time.

The capturing device may then implement the instruction, and continue capturing and streaming.

The server may receive the captured media from the capturing device, including a portion of the media captured after each instruction is expected to have been received and implemented.

Upon receiving the media, the server may verify whether the streamed media indeed reflects implementation of the transmitted instruction. For example, the server may verify that the frame rate is as instructed, that the directional light is captured in the images correctly, or the like. It will be appreciated that the server does not need to check each and every frame or audio sample, and it may be sufficient to check one or more frames, frame parts, or audio samples after the transmission of the instruction to verify its implementation. The verifier may select any pattern of frames to validate, including a periodic check, analysis of a number of frames within a timeframe, or the like. Thus, the server can verify the authenticity in near real-time.

It will be appreciated that the server may transmit further instructions which the capturing device may implement, for example an instruction may be submitted at predetermined time intervals, at random time intervals, or the like. Once instructions are submitted, frames or other samples of the media can be verified in accordance with the corresponding time intervals. Thus, the media may comprise a plurality of portions, each of which corresponds to an operation mode consistent with a different instruction.

The verification requires that the media reflecting implementation of the instruction is to be received within a predetermined period of time after the instruction has been transmitted. Due to the short time available and the heavy computational burden of forging the media, this requirement may disable manipulating the media. Optionally, due for example to delays, missing frames, or the like.

In some embodiments, some relaxation of the requirements may be exercised, to accommodate for delays, missing frames, or the like. Thus, it may be required, for example, that at least a predetermined number or percentage of frames or samples comply with the instructions, that at most a predetermined number of frames are missing or do not reflect implementation of the instruction, or the like. However, there may be a maximal time threshold that cannot be exceeded until the effect of a transmitted instruction is identified in the streamed media Subject to the media stream complying with the instruction, a verification indication may be provided. In some embodiments, the indication may be provided during the streaming session. The indication may be provided to the client that streamed the media, or to another device. For example, one or more participants in a teleconference may receive an indication that the captured session or the media captured by another participant of the conference is authentic.

In further embodiments, the server may compute one or more fingerprints upon the verified stream, such as hash values, and may store the fingerprints in a storage device, for example in a database accessible to the server. Then, given a second media stream, fingerprints thereof may be computed and searched for in the database. If the values are found, authenticity of the second media stream may be verified.

In some embodiments, verification may not be performed in real time, but rather at a later time, or even upon request, if and when a potential consumer requests to verify the authenticity of the video.

In some embodiments, verification may be performed only under certain conditions or situations. For example, a video uploaded to Facebook® may be verified only if it becomes viral, for example has more than a predetermined number of shares.

In some embodiments, the server may store the entire media for further future verification, for example by comparing the full content of the media to a media provided by an inquirer.

In some embodiments, a private-public key combination may be used to sign a video in order to certify it, so as to allow third parties to check whether the video was certified during or shortly after its creation, using the corresponding public key One technical effect of the disclosed subject matter is the effective verification of the authenticity of media, thus overcoming attacks such as deepfake attacks. Using the disclosure, it is extremely hard to manipulate or tamper with the media and still maintain the verification. Since the disclosed subject matter may require activation of one or more of a multiplicity of operation modes, the space of possible changes at different times is extremely large, i.e., there may be numerous possible sensor changes of different types, lengths and/or times. Therefore, preparing multiple deepfake videos in advance and transmitting the one that corresponds to the instruction is impractical due to the huge number of options, and therefore cannot be used for successfully imitating a verified video. For example, if a video has a frame rate of 50 frames per second, a deceiver may be required to calculate each fraud frame to replace the original frame in $\frac{1}{50}$ of a second. As disclosed above, the server may not be required to analyze the validity of each frame, but can check only a few representative frames.

Another technical effect of the disclosed subject matter is that it is useful for near real-time verification, for example during a streaming session, but is just as useful for posterior verification, for example verifying the authenticity of media downloaded from the Internet, received through a social network, or the like.

Yet another technical effect of the disclosed subject matter is that the verification can be provided to any requestor, whether the requestor is the creator of the media, a participant in the creation of the media, received the media directly from a creator, received the media indirectly through further sharing, downloading from the Internet, or the like.

Referring now to FIGS. 1A-1D, showing schematic illustrations of environments in which the disclosed subject matter may be used.

Figure 1A:
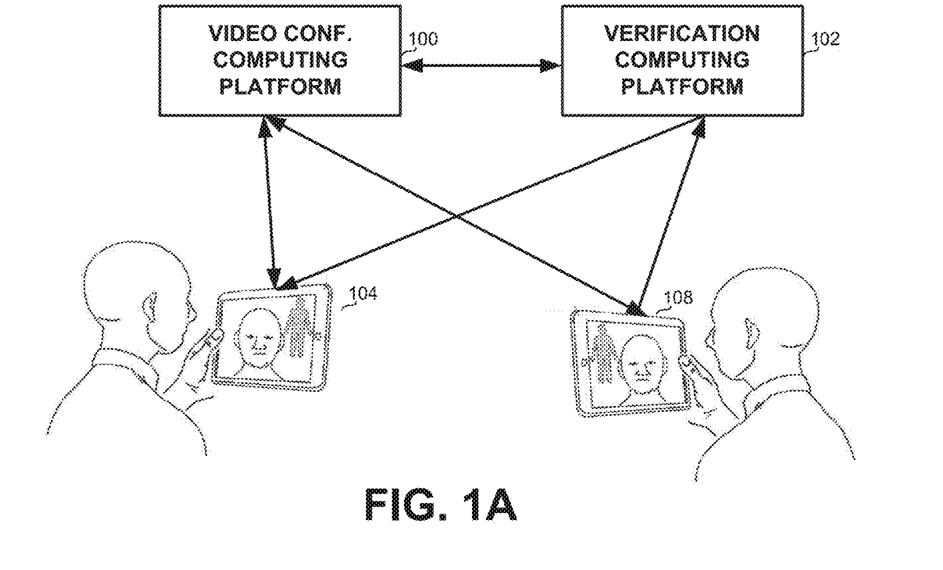
FIGS. 1A-1D show schematic illustrations of environments in which the disclosed subject matter may be used, in accordance with some exemplary embodiments of the disclosed subject matter.

FIG. 1A shows a scenario of two or more people communicating through computerized device, such as but not limited to participating in a video conference (VC). The first person uses First Client Device 104, being a computing platform that may capture or stream media. First Client Device 104 may be a mobile phone, a tablet, a desktop computer, a laptop computer, a speakerphone, a network connected camera, a video camera, or any other computing platform having at least one capturing sensor, and communication capabilities. The second person may use Second Client Device 108, also being a computing platform that may capture or stream media. Second Client Device 108 may also be a mobile phone, a tablet, a desktop computer, a laptop computer, a speakerphone, a network connected camera, a video camera, or any other computing platform having at least one capturing sensor, and communication capabilities. The VC may be provided and handled by a VC Computing Platform 100, which may also be implemented as a computing platform, such as but not limited to a server, a cloud server, a desktop computer, or the like. In some embodiments, VC Computing Platform 100 may be implemented on one of the user devices, e.g., First Client Device 104 or Second Client Device 108. It will be appreciated that more than two participants can participate in the VC.

It may be required to verify the authenticity of media recorded by a client device, for example First Client Device 104, to one or more other users, such as the user using Second Client Device 108. Verification may be performed by Verification Computing Platform 102, which may be implemented on a separate platform such as a server, a cloud server, a desktop computer, or the like, as part of VC Computing Platform 100, or the like. Verification Computing Platform 102 may be accessible to VC Computing Platform 100 or to one or more client devices. It will be appreciated that Verification Computing Platform 102 can also be operative in other situations in which it is required to verify the authenticity of media captured by more than one participant, for example verify the authenticity of each participant of the VC to one or more other participants.

Verification Computing Platform 102 may be accessed by VC Computing Platform 100, or by Second Client Device 108. Verification Computing Platform 102 may send instructions to First Client Device 104 and verify the video stream transmitted by First Client Device 104 following the instruction.

Figure 1B:
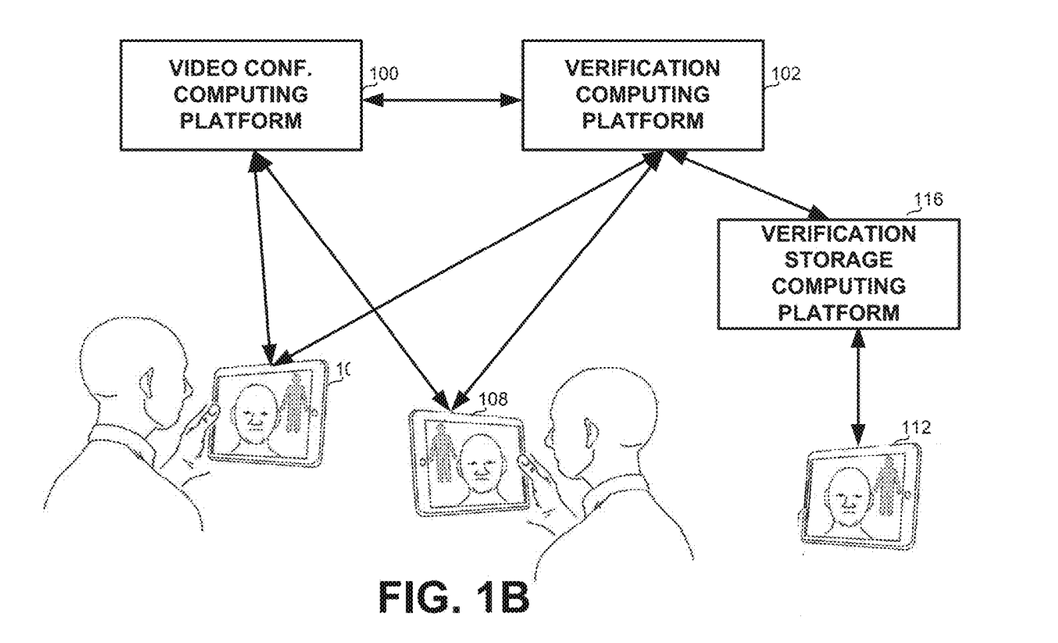

FIG. 1B shows a similar scenario, in which it may be required to verify the authenticity of both sides of the conversation to each other. Thus, in this scenario, First Client Device 104 and Second Client Device 108 may receive instructions from Verification Computing Platform 102 to implement an operation mode.

In addition, a media fingerprint of the recorded media may be stored and handled by yet another computing platform, such as Verification Storage Computing Platform 116. It will be appreciated that Verification Storage Computing Platform 116 may be implemented as part of VC Computing Platform 100, Verification Computing Platform 102, or any other computing platform accessible to Verification Computing Platform 102. Verification Storage Computing Platform 116 may be accessed by a third party Viewer Device 112 used by any user, whether the user participated in the VC or not, after the recording has been verified, for example when the recording is streamed or downloaded from the Internet. Viewer Device 112 may also be implemented on a mobile phone, a tablet, a desktop computer, a laptop computer, a speakerphone, or the like.

Figure 1C:
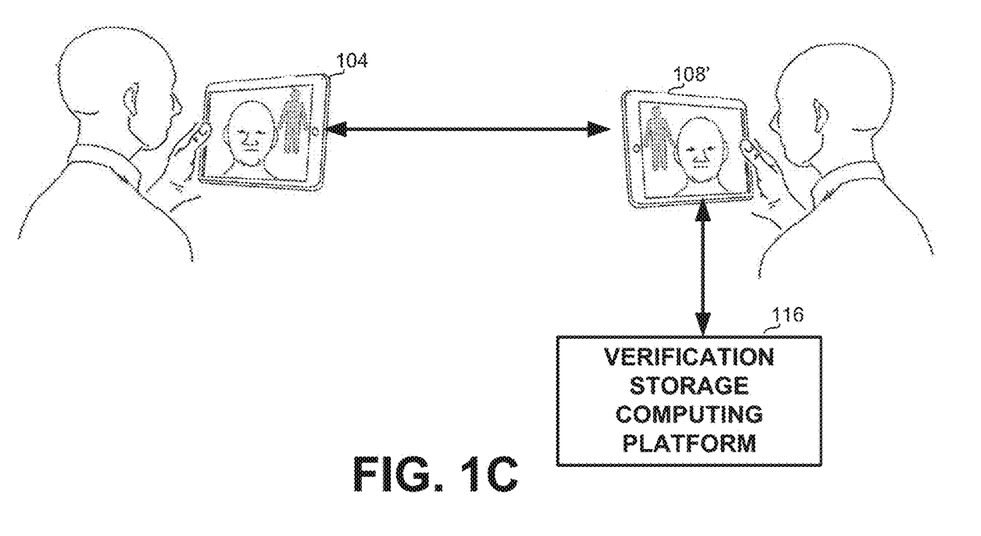

FIG. 1C shows a peer-to-peer (P2P) VC, between a first user using First Client Device 104 and a second user using Second Client Device 108', wherein Second Client Device 108' may also comprise VC Computing Platform 100 and Verification Computing Platform 102. Computing Platform 102 implemented within Second Client Device 108' may transmit instructions to First Client Device 104, in order to identify the authenticity of the media captured by First Client Device 104. Fingerprint of the recorded media can be stored in Verification Storage Computing Platform 116, such that authentication of the recorded media can be provided to a later viewer of the recording.

Figure 1D:
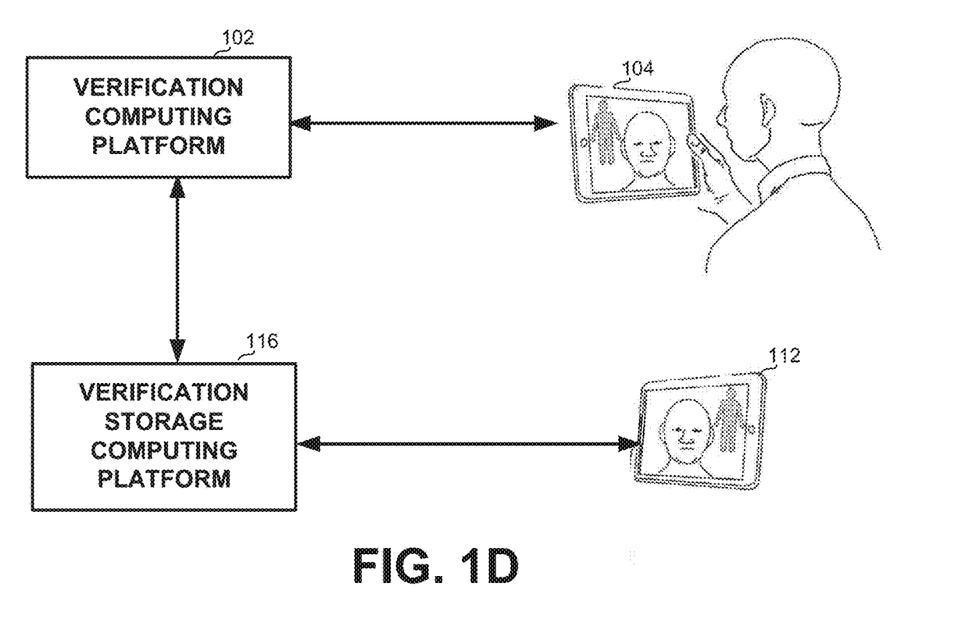

FIG. 1D shows a person recording media using First Client Device 104, wherein the media is verified by Verification Computing Platform 102, which may be implemented on First Client Device 104 or on a different platform. A fingerprint of the recorded media may be stored on Verification Storage Computing Platform 116, which may be accessed later by viewer Device 112 asking to verify that the media was authenticated.

It will be appreciated that the scenarios of FIGS. 1A-1D are exemplary only, and that multiple other scenarios and combinations of devices and servers may occur. In any of the scenarios, media captured by one or more devices may be authenticated for users of other devices, whether participating in the same event or watching it at a later time.

Figure 2:
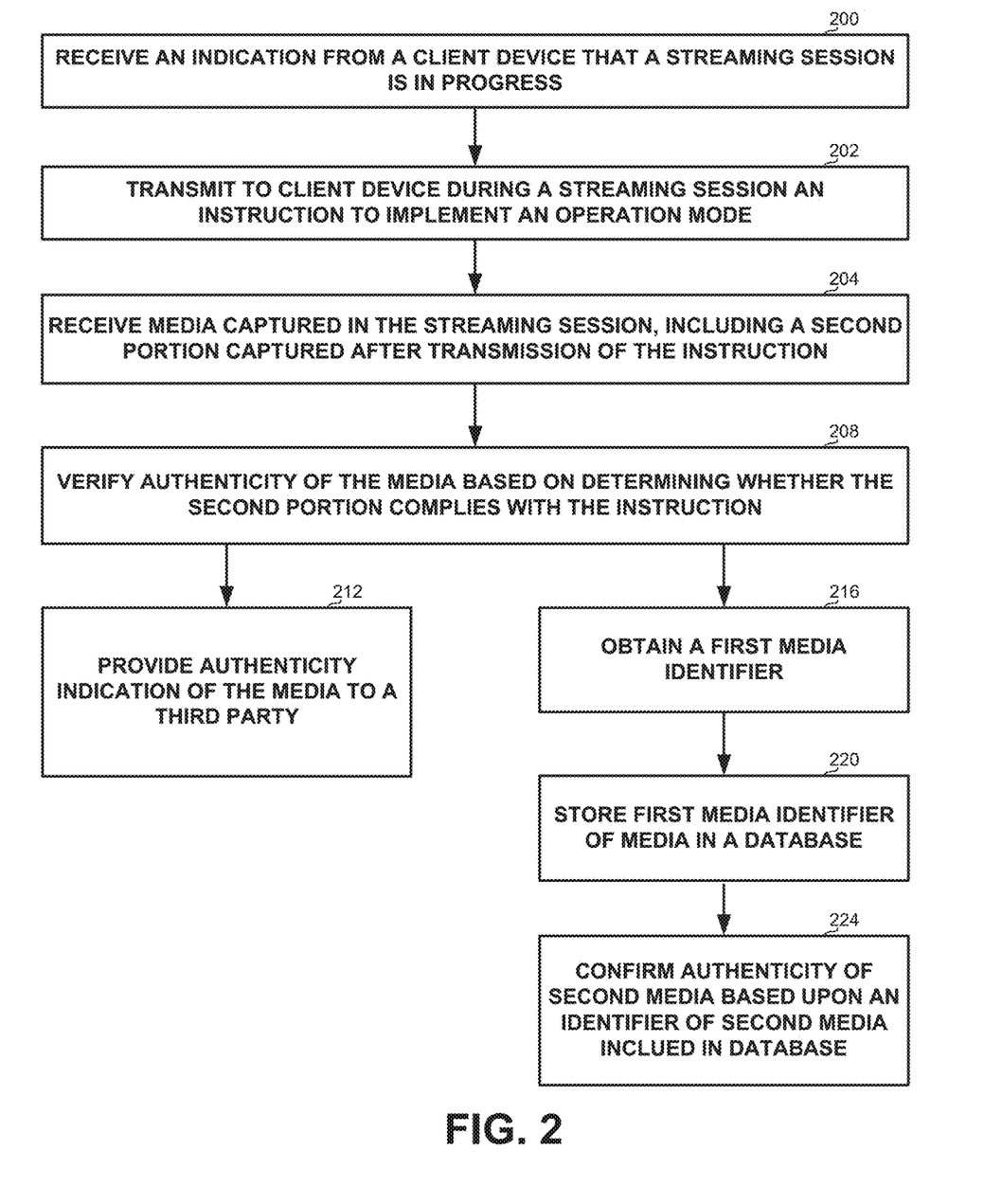
FIG. 2 shows a method for verifying authenticity of media, in accordance with some exemplary embodiments of the disclosed subject matter.

Referring now to FIG. 2, showing a flowchart of a method for verifying authenticity of media, in accordance with some exemplary embodiments of the disclosed subject matter. The method may be performed by a computing platform, such as Server 100 of FIG. 1.

On step 200, an indication that a streaming session is in progress may be received from a client device, such as First Client Device 104 of FIG. 1. The indication may or may not comprise the streamed media. For example, First Client Device 104 may use an application, which in addition to capturing and streaming the media, also indicates to the server about the capturing process. Additionally or alternatively, the method may be initialized, e.g., by a user selecting and/or pressing an icon of an application and/or a software program which may be installed on First Client Device 104, before the media is captured, or before the portion to be verified is captured. In some embodiments, the indication may comprise the parameters and actuators that can be set in accordance with the existing configuration of the capturing device.

On step 202, the server may provide to the client device an instruction to implement an operation mode.

The operation mode may relate to setting or changing a capturing parameter that affects a manner in which the capturing device captures the media, such as but not limited to any one or more of the following:
  Frame rate, e.g., a time period between captured frames;
  Resolution of captured frames, some of the captured frames, or one or more parts of one or more frames;
  Microphone parameters, such as sensitivity, sample rate, or the like.
  Any other audio or video capture parameter.

In some exemplary embodiments, operation mode may relate to operating an actuator comprised in or operatively coupled to the capture device, to cause an effect that is capturable by the capturing device, such as but not limited to any one or more of the following:
  Add vibrations by a vibrator of the capturing device, wherein the vibrations may be of a predetermined pattern;

Add audio input by a speaker, such that the audio input will be captured by a microphone of the capturing device. The audio input may be, for example, in a frequency that is out of the hearable range of a human ear, such that implementing the instruction is unnoticeable by a human. The audio input may be added for a predetermined period of time, a predetermined number of samples, for intermittent periods of time, or the like.

Activate flashlight or another visual sign so as to affect the captured video, possibly in a specific manner. For example, the flashlight may be of directional light directed to a specific area of the frame, of a desired color, polarity, or having any other controllable parameters. The flashlight may be activated for a predetermined number of frames, a predetermined period of time, every second, third, or the like frame for a predetermined period of time or a predetermined number of frames, or the like. In some embodiments, the flashlight or another visual sign may be added every n-th frame, for example every $20^{th}$ frame, such that implementing the instruction is unnoticeable by a human consuming the media.

The instruction may be determined so as not to harm, or harm as little as possible the experience of a consumer of the media.

In some embodiments, the indication received by the server on step 200 may indicate the actuators available to First Client Device 104 or to a capturing device associated therewith, such that the server can determine an instruction that is within the options of First Client Device 104.

In some embodiments, the instructions may be determined based on analysis of the media itself. For example, for media with high music intensity, such as a concert, the instruction may have a visual effect rather than audio effect, so as not to harm the user experience. In another example, utilizing a certain light, such as directional red LED light over an object whose color is known to be reddish may be performed, so as to make it redder. This implementation is useful, for example against a deception attempt performed using AR skins, which attempt to modify an image in real-time. However, as the AR skin modifies the actual perceived video, a verifier may not be aware of what information in the video is the outcome of the instruction. As an example, consider a skin that replaces an image of a cat by an image of a dog. A purple light that is reflected by the cat, causing it to be a bit purple may be captured in the video. However, the skin may replace the cat by a dog, without realizing that the dog should also be purple. As the skin does not separate the cat from the purple light, it may assume that the perceived cat is purple. It may not realize that the cat is not purple and that the same purple color should be applied on the dog that replaces the cat.

Upon receiving the instruction, the capturing device, for example First Client Device 104, may set the operation mode by setting the parameter or activating the actuator in accordance with the instruction, which has an effect on the captured media.

On step 204, the server may receive media captured during a streaming session, including a second portion of the media captured after the instruction had been transmitted on step 202. The media may also comprise portions captured prior to the instruction being transmitted, whether or not such media has been transmitted earlier.

On step 208, the server may verify the authenticity of the media, by checking whether the second portion of the media complies with the transmitted instruction. For example, if the instruction related to capture rate of the device, it may be determined whether the time stamps of the frames is consistent with the instructed frame rate; if the instruction was to add audio to the captured stream, it may be determined whether said audio is indeed found in the audio stream, or the like. It is expected to receive a portion of the media that reflects implementation of the instruction within a predetermined time after the instruction has been transmitted, to ensure real time response of the capture device, and disable forging of the media, which should require significantly more processing time. Thus, if no effect of implementing the instruction is found in frames within a predetermined period of time after the instruction has been transmitted, verification may fail. This verification may disable faking an existing media to seem like it complies with the instruction by making the relevant changes. As discussed above, the instruction space is too large for a deceiver to create all possible variations, and thus only by implementing the instruction in real time while capturing the media, such changes can be accommodated. It will be appreciated that additional authenticity checks, which may or may not be related to transmitted commands may be performed as well.

It will be appreciated that Server 100 does not necessarily need to check every frame of the second portion, but rather representative frames sufficient to evaluate whether the instruction has been applied.

It will be appreciated that Server 100 may transmit instructions to the client device on a periodical basis, in sporadic intervals, or the like, and may verify authenticity after each such instruction.

It will be appreciated that Server 100 may allow some slack in the verification process. For example, since one or more of the streamed frames or samples may be missed, or delays with receiving or processing the instructions may occur, some frames or samples within the second portion of the media can be allowed to be non-compliant with the instruction. However, as long as these frames or samples are limited in number and in time following the transmission of the instruction, the media may still be verified. In some embodiments, the number, percentage, or time span of the non-compliant frames may be determined in accordance with factors such as the user associated with a media stream, communication infrastructure, condition of the server or client, or the like.

On step 212, the authenticity indication may be provided to a third party that is receiving the media during the streaming session. For example, the indication may be provided to a participant in a video conference such as Second Client Device 108, to a spectator of a webinar such as Consumer Device 112, or the like. The indication may be provided to a list of clients provided by the creator of the media, e.g. First Client Device 104, in response to a query by a client device such as Second Client Device 108, or the like.

On step 216, subject to successful verification, Server 100 may obtain a first media identifier, for example one or more hash values representing the media. In some embodiments, the identifier may be calculated once the streaming session is over.

On step 220, the identifier may be stored within an identifier database. In some embodiments it may be stored in association with a name, date, unique ID or another identifying detail.

On step 224, It may be verified that a second media is the confirmed media, for example in response to a query by a consumer who may consume the second media after it was captured, for example received by e-mail, streamed or downloaded from a web site, or the like. In some embodiments, the query may include only an identifier of the second media as computed by the viewer, such that the server may verify that the identifier is stored in the database. In further embodiments, the viewer may transmit the second media, or a link to the media, the server may then compute the identifier for the second media, and if such identifier is found in the database, the second media may be confirmed for authenticity.

In some embodiments, a single frame and/or photograph may also be validated, e.g., by capturing, in addition to the photograph, a short video, e.g., a one second video, which includes the photograph. The short video may be validated as described, and the photograph may be compared to video frames to determine whether the photograph is included in the short video.

Figure 3:
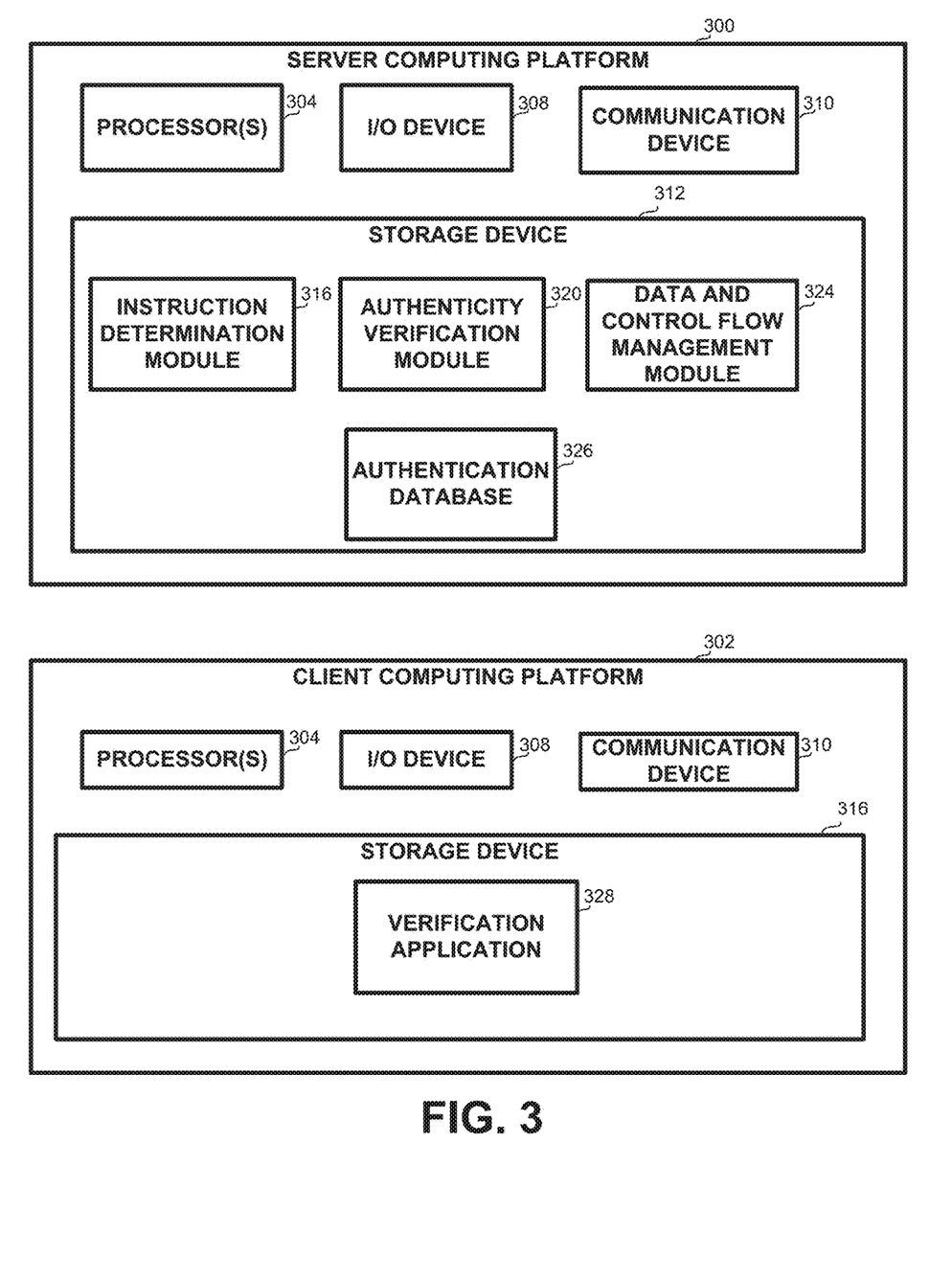
FIG. 3 shows a block diagram of a system configured for verifying authenticity of media, in accordance with some exemplary embodiments of the disclosed subject matter.

Referring now to FIG. 3, showing a block diagram of an apparatus for verifying media, in accordance with some embodiments of the disclosure.

The apparatus may comprise one or more Server Computing Platforms 300 or one or more Client Computing Platforms 302. Server Computing Platform 300 details an exemplary embodiment of Server 100 of FIG. 1, and Client Computing Platform 302 details an exemplary embodiment of First Client Device 104, Second Client Device 108 or third party Viewer Device 112 of FIG. 1

In some embodiments, Server Computing Platforms 300 and Client Computing Platforms 302 may be remote from each other and communicate via any communication channel such as the Internet, Intranet, Local Area Network (LAN), Wide Area Network (WAN), or the like. In some embodiments, Server Computing Platforms 300 may be implemented as a cloud computing device.

Each Server Computing Platform 300 may comprise a Processor 304. Processor 304 may be a Central Processing Unit (CPU), a microprocessor, an electronic circuit, an Integrated Circuit (IC) or the like. Processor 304 may be utilized to perform computations required by the apparatus or any of it subcomponents, such as the steps disclosed in association with FIG. 2 above.

Each Server Computing Platform 300 may comprise an Input/Output (I/O) Device 308 such as a display, a pointing device, a keyboard, a touch screen, or the like. I/O Device 308 may be utilized to provide output to and receive input from a user. However, in some embodiments, Server Computing Platform 300 may operate without an I/O device.

In some exemplary embodiments of the disclosed subject matter, Server Computing Platform 300 may comprise Communication Device 310 such as a network adaptor. Communication Device 310 may enable Server Computing Platform 300 to communicate with other platforms such as one or more Client Computing Platforms 302.

In some exemplary embodiments, one or more Server Computing Platforms 300 may comprise a Storage Device 312. Storage Device 312 may be a hard disk drive, a Flash disk, a Random Access Memory (RAM), a memory chip, or the like. In some exemplary embodiments, Storage Device 312 may retain program code operative to cause processor 304 to perform acts associated with any of the subcomponents of Server Computing Platforms 300. The components detailed below may be implemented as one or more sets of interrelated computer instructions, executed for example by Processor 304 or by another processor. The components may be arranged as one or more executable files, dynamic libraries, static libraries, methods, functions, services, or the like, programmed in any programming language and under any computing environment.

Storage Device 312 may store Instruction Determination Module 316, for determining an instruction to be transmitted to and implemented by a capture device capturing media, in response to an indication received with or without streamed media. The instruction may be determined in a random or pseudo-random manner. The instruction may refer to an arbitrary action mode, relating to a parameter or actuator available to the capturing device, as may have been reported in the initial indication transmitted by the client device, that capturing and streaming is in process.

Storage Device 312 may store Authenticity Verification Module 320, for receiving a stream of media, and determining that it complies with one or more instructions provided to a capture device that captured the media. Verification may be performed by examining one or more images or audio samples of the media. For example, if the instruction relates to emitting a directional light, the presence of such light on one or more frames may be determined, and similarly for vibrations, audio samples, capture rate, or the like.

Storage Device 312 may store Data and Control Flow Management Module 324, for managing one or more sessions with one or more clients, whether a client that is currently streaming media and the media is being authenticated, a client that receives confirmations to the authenticity of currently processing streaming media, or a client that requests authenticity confirmation to an existing media.

Storage Device 312 may store or be in communication with authentication database 326, storing identifiers of one or more verified media streams.

Client Computing Platform 302 may comprise a Processor 304, I/O Device 308, Communication Device 310 or Storage Device 316 as described above for Server Computing Platform 300.

Storage Device 316 may store Verification Application 328, which may have one or more modes. In a first mode, Client Computing Platform 302 may request Server Computing Platform 300 to verify the authenticity of a media it is streaming. In a second mode, Client Computing Platform 302 may request, or receive without requesting, a verification indication to a media that is currently being captured and streamed. In a third mode, Client Computing Platform 302 may request, or receive without requesting, a verification indication to a previously captured media that Client Computing Platform 302 is currently playing.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method performed by a processing platform, wherein the method comprising:

during a streaming session of a media by a capturing device to the processing platform, transmitting to the capturing device an instruction to implement an operation mode when capturing a second portion of the media, wherein a determination of the operation mode is performed automatically by the processing platform;

receiving from the capturing device the media, wherein the media comprises at least a first portion and the second portion; and verifying authenticity of the media, wherein said verifying is based on a determination that the second portion of the media complies with the operation mode.

2. The method of claim 1, wherein said verifying comprises verifying that the second portion of the media is streamed to the processing platform within a time threshold from a time in which the instruction is transmitted to the capturing device.

3. The method of claim 1, wherein the media is selected from at least one of: a video data and an audio data.

4. The method of claim 1, wherein the operation mode comprises a capturing parameter of the capturing device, wherein the capturing parameter affects a manner in which the capturing device captures the media.

5. The method of claim 4, wherein the capturing parameter is at least one of: a resolution level, a frame rate, a light sensitivity, and a microphone capturing parameter.

6. The method of claim 1, wherein the operation mode comprises an indication of operating an actuator to cause an effect that is capturable by the capturing device.

7. The method of claim 6, wherein the actuator is operatively coupled to the capturing device.

8. The method of claim 6, wherein the instruction is at least one of:

an instruction to activate a flashlight;
an instruction to cause emission of directional light;
an instruction to cause emission of light in a predetermined light spectrum;
an instruction to generate an audio signal via a speaker; and
an instruction to activate a vibration motor.

9. The method of claim 1, wherein implementing the instruction is unnoticeable by a human.

10. The method of claim 9, wherein the audio signal comprises frequencies undetectable by a human ear.

11. The method of claim 1, further comprises, in response to said verifying, providing to a third-party that is receiving the media during the streaming session, an indication of authenticity of the media.

12. The method of claim 1, further comprises:

obtaining a first media fingerprint that is computed based on the media;
in response to said verifying, storing the first media fingerprint of the media in a verified media database; and
verifying authenticity of a second media that is characterized by a second media fingerprint, wherein said verifying is performed based on a determination that the second media fingerprint is included in the verified media database.

13. The method of claim 12, further comprises the processing platform computing the second media fingerprint based on the second media.

14. The method of claim 12, further comprises the processing platform receiving the second media fingerprint from a querying device.

15. The method of claim 1, wherein the media comprises a plurality of portions, each of which corresponds to an operation mode consistent with a different instruction, wherein the plurality of portions comprises the second portion.

16. The method of claim 1, wherein the authenticity of the media is verified subject to frames of the second portion which are incompliant with the operation mode, being captured at the latest at a predetermined period after a time in which the instruction is transmitted to the capturing device.

17. The method of claim 1, wherein the processing platform is a server.

18. The method of claim 1, wherein the processing platform is implemented on a second capture device, wherein the capture device and the second capture device are used in a peer-to-peer video conference.

19. The method of claim 1, wherein the operation mode is determined based on analysis of at least a part of the first portion.

20. A method performed by a capturing device during a streaming session of a media, wherein the streaming session comprises streaming the media to a processing platform the method comprising:

capturing a first portion of the media by the capture device operating at a first operation mode;
receiving from the processing platform an instruction to set a second operation mode, wherein the second operation mode is determined automatically by the processing platform; and
capturing a second portion of the media by the capture device while operating at the second operation mode.

21. A system having a processor and a memory, the processor being adapted to perform the steps of:

during a streaming session of a media by a capturing device to the processing platform, transmitting to the capturing device an instruction to implement an operation mode when capturing a second portion of the media, wherein determination of the operation mode is performed automatically by the processing platform;
receiving from the capturing device the media, wherein the media comprises at least a first portion and the second portion; and
verifying authenticity of the media, wherein said verifying is based on a determination that the second portion of the media complies with the operation mode.

22. A computer program product comprising a non-transitory computer readable medium retaining program instructions, which instructions when read by a processor, cause the processor to perform:

during a streaming session of a media by a capturing device to the processing platform, transmitting to the capturing device an instruction to implement an operation mode when capturing a second portion of the media, wherein determination of the operation mode is performed automatically by the processing platform;
receiving from the capturing device the media, wherein the media comprises at least a first portion and the second portion; and
verifying authenticity of the media, wherein said verifying is based on a determination that the second portion of the media complies with the operation mode.

* * * * *